(12) United States Patent
Williams et al.

(10) Patent No.: US 12,270,343 B2
(45) Date of Patent: *Apr. 8, 2025

(54) PROPORTIONAL RESTRICTION OF FUEL NOZZLE WITH AN AUXILIARY CIRCUIT

(71) Applicant: Collins Engine Nozzles, Inc., Des Moines, IA (US)

(72) Inventors: Brandon P. Williams, Johnston, IA (US); Michael Ferrarotti, Durham, CT (US); Murtuza Lokhandwalla, South Windsor, CT (US); Todd Haugsjaahabink, Amherst, MA (US); Russell P. Rourke, Jr., East Granby, CT (US); Jay W. Kokas, Bloomfield, CT (US); Richard E. Versailles, New Hartford, CT (US); Charles E. Reuter, Granby, CT (US); Kevin Gibbons, Torrington, CT (US); Jesse C. Peters, Windsor, CT (US); Jason A. Ryon, Carlisle, IA (US)

(73) Assignee: Collins Engine Nozzles, Inc., Des Moines, IA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/224,843

(22) Filed: Jul. 21, 2023

(65) Prior Publication Data

US 2024/0068664 A1 Feb. 29, 2024

Related U.S. Application Data

(63) Continuation-in-part of application No. 17/896,773, filed on Aug. 26, 2022, now Pat. No. 11,970,976.

(51) Int. Cl.
*F02C 7/232* (2006.01)
*F02C 9/26* (2006.01)
(Continued)

(52) U.S. Cl.
CPC .............. *F02C 7/232* (2013.01); *F02C 9/263* (2013.01); *F02C 9/34* (2013.01); *F23R 3/28* (2013.01)

(58) Field of Classification Search
CPC .. F02C 7/22; F02C 7/222; F02C 7/228; F02C 7/232; F02C 9/26; F02C 9/263; F02C 9/28; F23R 3/28
See application file for complete search history.

(56) References Cited

U.S. PATENT DOCUMENTS 3,662,959 A  5/1972 Sample
3,728,859 A  4/1973 Seiler
(Continued)

FOREIGN PATENT DOCUMENTS

EP  2497923 A2  9/2012
EP  2597285 A2  5/2013
(Continued)

OTHER PUBLICATIONS

Extended European Search Report dated Jan. 24, 2024 for corresponding European Application No. 23193568.5.
(Continued)

*Primary Examiner* — William H Rodriguez
(74) *Attorney, Agent, or Firm* — Kinney & Lange, P.A.

(57) ABSTRACT

A fuel injector for a turbine engine includes a fuel scheduling valve configured for regulation of fuel flow from a fuel inlet, in response to fuel pressure received at the fuel inlet. Primary, secondary and auxiliary fuel circuits receive fuel from the scheduling valve, and an electrically-controlled valve is provided in fluid communication with the auxiliary circuit, which electrically-controlled valve is adapted and configured to actively control fuel through the auxiliary circuit in response to a control signal.

20 Claims, 7 Drawing Sheets

(51) Int. Cl.
  *F02C 9/34* (2006.01)
  *F23R 3/28* (2006.01)

(56) References Cited

U.S. PATENT DOCUMENTS

| | | | |
|---|---|---|---|
| 4,655,912 A | 4/1987 | Bradley et al. | |
| 4,726,396 A | 2/1988 | Bradley et al. | |
| 4,817,375 A * | 4/1989 | Brocard | F02C 9/28 251/285 |
| 4,817,389 A | 4/1989 | Holladay et al. | |
| 4,962,887 A | 10/1990 | Matsuoka | |
| 5,257,502 A | 11/1993 | Napoli | |
| 5,339,636 A | 8/1994 | Donnelly et al. | |
| 5,406,798 A | 4/1995 | Wiesner, Jr. | |
| 5,417,054 A | 5/1995 | Lee et al. | |
| 5,568,721 A | 10/1996 | Alary et al. | |
| 5,732,730 A | 3/1998 | Shoemaker et al. | |
| 5,735,117 A | 4/1998 | Toelle | |
| 6,003,781 A | 12/1999 | Kwan | |
| 6,119,960 A | 9/2000 | Graves | |
| 6,314,717 B1 | 11/2001 | Teets et al. | |
| 6,351,948 B1 | 3/2002 | Goeddeke | |
| 6,357,237 B1 | 3/2002 | Candy et al. | |
| 7,255,290 B2 | 8/2007 | Bright et al. | |
| 8,316,630 B2 | 11/2012 | Futa et al. | |
| 8,347,599 B2 | 1/2013 | Scully | |
| 8,387,400 B2 | 3/2013 | Goeke et al. | |
| 8,438,851 B1 | 5/2013 | Uhm et al. | |
| 8,483,931 B2 | 7/2013 | Williams et al. | |
| 8,666,632 B2 | 3/2014 | Zebrowski et al. | |
| 8,677,754 B2 | 3/2014 | Lueck et al. | |
| 8,807,463 B1 | 8/2014 | McAlister | |
| 8,820,087 B2 | 9/2014 | Ryan | |
| 9,121,349 B2 | 9/2015 | Griffiths et al. | |
| 9,234,465 B2 | 1/2016 | Futa et al. | |
| 9,488,107 B2 | 11/2016 | Rodrigues et al. | |
| 9,494,079 B2 | 11/2016 | Pousseo et al. | |
| 9,840,992 B2 | 12/2017 | Duncan et al. | |
| 10,041,411 B2 | 8/2018 | Chabaille et al. | |
| 10,174,948 B2 | 1/2019 | Hill | |
| 10,288,294 B2 | 5/2019 | Griffiths et al. | |
| 10,408,131 B2 | 9/2019 | Thompson et al. | |
| 10,465,908 B2 | 11/2019 | Stevenson et al. | |
| 10,487,957 B2 | 11/2019 | Bleeker et al. | |
| 10,502,138 B2 | 12/2019 | Reuter et al. | |
| 10,982,858 B2 | 4/2021 | Bickley | |
| 11,067,278 B2 | 7/2021 | Prociw et al. | |
| 11,215,121 B2 | 1/2022 | Stevenson | |
| 11,371,439 B2 | 6/2022 | Di Martino et al. | |
| 11,408,347 B2 | 8/2022 | Reuter et al. | |
| 11,408,348 B2 | 8/2022 | Culwick | |
| 11,421,600 B1 | 8/2022 | Reuter et al. | |
| 11,549,687 B2 | 1/2023 | Griffiths et al. | |
| 11,643,970 B2 | 5/2023 | Baker et al. | |
| 11,913,381 B1 | 2/2024 | Williams et al. | |
| 11,970,976 B2 * | 4/2024 | Lokhandwalla | F23R 3/36 |
| 11,970,977 B2 * | 4/2024 | Lokhandwalla | F23R 3/346 |
| 12,060,831 B1 * | 8/2024 | Williams | F02C 9/34 |
| 2002/0073707 A1 | 6/2002 | Lavie et al. | |
| 2003/0093998 A1 | 5/2003 | Michau et al. | |
| 2004/0025492 A1 | 2/2004 | Griffiths et al. | |
| 2005/0198964 A1 | 9/2005 | Myers et al. | |
| 2005/0217269 A1 | 10/2005 | Myers et al. | |
| 2005/0224598 A1 | 10/2005 | Potz et al. | |
| 2006/0144964 A1 | 7/2006 | Boecking | |
| 2006/0236974 A1 | 10/2006 | Randall | |
| 2008/0309261 A1 | 12/2008 | Anson | |
| 2009/0077945 A1 * | 3/2009 | Cornwell | F23R 3/28 60/39.281 |
| 2009/0173810 A1 | 7/2009 | Rodrigues et al. | |
| 2009/0204306 A1 | 8/2009 | Goeke et al. | |
| 2009/0234555 A1 | 9/2009 | Williams et al. | |
| 2009/0277185 A1 | 11/2009 | Goeke et al. | |
| 2010/0005776 A1 | 1/2010 | Lueck et al. | |
| 2010/0037615 A1 | 2/2010 | Williams et al. | |
| 2010/0050593 A1 | 3/2010 | Futa et al. | |
| 2010/0058770 A1 | 3/2010 | Ryan | |
| 2012/0159953 A1 | 6/2012 | Griffiths et al. | |
| 2012/0198852 A1 | 8/2012 | Hernandez et al. | |
| 2012/0260663 A1 | 10/2012 | Pidcock | |
| 2012/0261000 A1 | 10/2012 | Futa et al. | |
| 2013/0042920 A1 | 2/2013 | Snodgrass et al. | |
| 2013/0043331 A1 | 2/2013 | Snodgrass et al. | |
| 2013/0061599 A1 | 3/2013 | Van Alen | |
| 2014/0034023 A1 | 2/2014 | Coldren | |
| 2014/0311455 A1 | 10/2014 | Kim et al. | |
| 2015/0096301 A1 | 4/2015 | Chabaille et al. | |
| 2015/0292412 A1 | 10/2015 | Rodrigues et al. | |
| 2016/0017808 A1 | 1/2016 | Chabaille et al. | |
| 2016/0230904 A1 | 8/2016 | Zarrabi et al. | |
| 2016/0245524 A1 | 8/2016 | Hill | |
| 2016/0298851 A1 | 10/2016 | Brickwood et al. | |
| 2017/0268781 A1 | 9/2017 | Stevenson et al. | |
| 2018/0066588 A1 | 3/2018 | Daly et al. | |
| 2018/0066591 A1 | 3/2018 | Ozzello et al. | |
| 2018/0163635 A1 | 6/2018 | Marocchini et al. | |
| 2018/0163637 A1 | 6/2018 | Griffiths | |
| 2018/0163966 A1 | 6/2018 | Jones et al. | |
| 2018/0291831 A1 | 10/2018 | Hirano | |
| 2018/0372321 A1 | 12/2018 | Yates et al. | |
| 2018/0372323 A1 | 12/2018 | Griffiths | |
| 2021/0017908 A1 | 1/2021 | Di Martino et al. | |
| 2021/0018177 A1 | 1/2021 | Griffiths et al. | |
| 2022/0364658 A1 * | 11/2022 | Shelby | F16K 31/406 |
| 2023/0050741 A1 | 2/2023 | Xuening et al. | |
| 2023/0175443 A1 * | 6/2023 | Bickley | F02C 7/232 60/39.281 |
| 2024/0068412 A1 | 2/2024 | Williams et al. | |

FOREIGN PATENT DOCUMENTS

| | | |
|---|---|---|
| EP | 3070408 A1 | 9/2016 |
| EP | 3767091 A1 | 1/2021 |
| GB | 2451144 A | 1/2009 |
| GB | 2458213 A | 9/2009 |
| WO | 9408179 A1 | 4/1994 |

OTHER PUBLICATIONS

Extended European Search Report dated Jan. 26, 2024, for corresponding European Patent Application No. 23193755.8.
Extended European Search Report dated Jan. 30, 2024 for corresponding European Application No. 23193496.9.
Extended European Search Report dated Jan. 30, 2024, for corresponding European Patent Application No. 23193474.6.
Extended European Search Report dated Mar. 5, 2024, for corresponding European Patent Application No. 23193724.4.
Extended European Search Report dated Nov. 25, 2024, for corresponding European Patent Application No. 24189906.1.
Final Office Action dated Feb. 3, 2025, for corresponding U.S. Appl. No. 18/109,555, 63 pgs.

* cited by examiner

PROPORTIONAL RESTRICTION OF FUEL NOZZLE WITH AN AUXILIARY CIRCUIT

CROSS-REFERENCE TO RELATED APPLICATIONS

This is a continuation-in-part of U.S. patent application Ser. No. 17/896,773 filed Aug. 26, 2022, the content of which is incorporated herein in its entirety.

BACKGROUND

Field of the Invention

The present invention relates to fuel control and delivery systems of turbine engines, particularly to fuel injectors and nozzles, such as those found in commercial aircraft.

Description of the Related Art

Turbine fuel control systems, such as those typically found in commercial aircraft include various robust controls to allow for optimized operational characteristics under different load conditions.

Often, a mechanical fuel metering or "scheduling" valve is provided in connection with a fuel injector and serves to respond to an increase in fuel pressure supplied to it by gradually opening one or more flow paths, such as to a primary and/or secondary fuel injector nozzle. A resistive spring provides the force balance to limit the rate at which the scheduling valve opens. These valves can be used to divide flow as well, providing multiple flow paths that can be sequenced/scheduled based on inlet fuel pressure, valve open area, and any downstream flow devices such as atomizers. At relatively low flow conditions, the flow scheduling valve is largely responsible for most of the metering and therefore consumes/requires the majority of the fuel pressure. At relatively high flow conditions, there is a transition of pressure drop from the valve to other components downstream of the valve. One such fuel scheduling valve is described in U.S. Pat. No. 5,732,730 to Shoemaker, et al., which reference is incorporated herein by reference in its entirety.

Gas turbine combustors will typically have a natural frequency that may become excited when a certain heat release is attained. Quite often this phenomenon occurs at ground conditions, however, it can also be a concern under multiple flow conditions. This condition can cause significant levels of noise and occasionally may negatively impact the health of the structural components within and around the combustor. To mitigate this noise, adjustments to fuel scheduling may be directed, in an attempt to decouple the heat release and noise, however, these attempts require additional flow dividing hardware and fuel manifolds, adding significant cost, weight, and power requirements.

Alternative fuel distribution systems also exist in the art that include a common fuel dividing valve, which distributes supplied fuel to separate manifolds, each manifold independently delivering a supply of fuel to separate fuel circuits of multiple injectors.

Although generally considered satisfactory, such aforementioned arrangements do not allow for active or granular control of injectors, which can lead to suboptimal performance and/or undesirable operational characteristics under certain operating conditions. Applicant recognizes, therefore, an ever present need for improved systems and methods for adjusting flow in passive injection valves.

SUMMARY

In accordance with a first aspect of the invention, a fuel injector for a turbine engine includes a housing having an internal enclosure for pressurized fluid, a fuel inlet formed on the housing, permitting delivery of a fuel supply to the fuel injector, a scheduling valve disposed within the housing, configured for regulation of fuel flow from the fuel inlet in response to fuel pressure received at the fuel inlet, a primary fuel circuit formed in the housing, receiving fuel from the scheduling valve, a secondary fuel circuit formed in the housing, receiving fuel from the scheduling valve, an auxiliary fuel circuit formed in the housing, receiving fuel from the scheduling valve, an electrically-controlled valve in fluid communication with the auxiliary fuel circuit, adapted and configured to actively control fuel through the auxiliary fuel circuit in response to a control signal, a fuel nozzle in fluid communication with and receiving fuel from the primary, secondary and auxiliary fuel circuits, a primary outlet formed on the nozzle, in fluid communication with the primary fuel circuit, a secondary outlet formed on the nozzle, in fluid communication with the secondary fuel circuit, and an auxiliary outlet formed on the nozzle, in fluid communication with the auxiliary fuel circuit.

The electrically-controlled valve can be a discrete open/closed valve. It is also contemplated that the electrically-controlled valve can be a proportional valve with intermediate conditions between fully open and fully closed. The proportional valve can include a proportional solenoid, a stepper motor, or a torque motor based servo valve with flapper and nozzle.

The scheduling valve can include a valve spool, biased to a closed position by one or more biasing members, wherein the valve spool is configured to regulate flow from the inlet of the injector to each of the primary and secondary circuits, and wherein the valve spool includes a scheduling surface configured to vary flow area through the secondary circuit based on position of the valve spool within the scheduling valve.

The valve spool can additionally be configured to regulate flow from the inlet of the injector to the auxiliary fuel circuit. The auxiliary fuel circuit can branch off of the primary fuel circuit. Alternatively, the auxiliary fuel circuit can be an independent fuel circuit downstream from the valve spool.

In accordance with the invention, activation of the electrically-controlled valve can control fuel flow rate through the auxiliary fuel circuit.

The electrically-controlled valve can be a binary valve. Alternatively, the electrically-controlled valve can be a modulating valve. Alternatively still, the electrically-controlled valve can be a motorized valve.

In accordance with a further aspect of the invention, a fuel supply system for a turbine engine includes a single fuel manifold adapted to receive and distribute a fuel supply to a plurality of points of the turbine engine, and a plurality of fuel injectors distributed around a periphery of the engine, adapted and configured to receive fuel from the single fuel manifold. In accordance with this aspect, at least one of the fuel injectors has a housing having an internal enclosure for pressurized fluid, a fuel inlet formed on the housing, permitting delivery of fuel supply from the single fuel manifold to the fuel injector, a scheduling valve disposed within the housing, configured for regulation of fuel flow from the fuel inlet in response to fuel pressure received at the fuel inlet, a primary fuel circuit formed in the housing, receiving fuel from the scheduling valve, a secondary fuel circuit formed in the housing, receiving fuel from the scheduling valve, an auxiliary fuel circuit formed in the housing, receiving fuel from the scheduling valve, an electrically-controlled valve in fluid communication with the auxiliary fuel circuit adapted and configured to actively control fuel through the auxiliary fuel circuit in response to a control signal, a fuel nozzle in fluid communication with and receiving fuel from the primary, secondary and auxiliary fuel circuits, a primary outlet formed on the nozzle, in fluid communication with the primary fuel circuit, a secondary outlet formed on the nozzle, in fluid communication with the secondary fuel circuit, and an auxiliary outlet formed on the nozzle, in fluid communication with the auxiliary fuel circuit.

The electrically-controlled valve can be a discrete open/closed valve. It is also contemplated that the electrically-controlled valve can be a proportional valve with intermediate conditions between fully open and fully closed. The proportional valve can include a proportional solenoid or a stepper motor.

In accordance with this aspect, the system can further include at least one passive fuel injector, receiving fuel from the single fuel manifold. The at least one passive fuel injector can include only one nozzle. If desired, the at least one passive fuel injector can be a duplex injector.

Moreover, a metering valve can be provided, and adapted and configured to receive a fuel supply from a fuel pump, and output the fuel to the single manifold.

The fuel supply system can further include a check valve arranged in a fuel supply line between a fuel pump and the single manifold.

A controller can be provided in connection with the system, and electrically connected to the electrically-controlled valve on at least one fuel injector for individual control thereof. Alternatively, a controller can be provided in connection with the system, and electrically connected to each of the electrically-controlled valves on a plurality of fuel injectors for ganged control thereof. Each of the injectors in the plurality of fuel injectors can include a mass flow sensor operatively connected to the controller to provide mass flow feedback to the controller.

These and other features of the devices, systems and related methods of the subject disclosure will become more readily apparent to those skilled in the art, from the following detailed description of the preferred embodiments taken in conjunction with the drawings.

BRIEF DESCRIPTION OF THE DRAWINGS

So that those skilled in the art to which the subject disclosure appertains will readily understand how to make and use the devices, systems and related methods of the subject disclosure without undue experimentation, preferred embodiments thereof will be described in detail herein below with reference to certain figures, wherein.

DETAILED DESCRIPTION OF THE PREFERRED EMBODIMENTS

Figure 1:
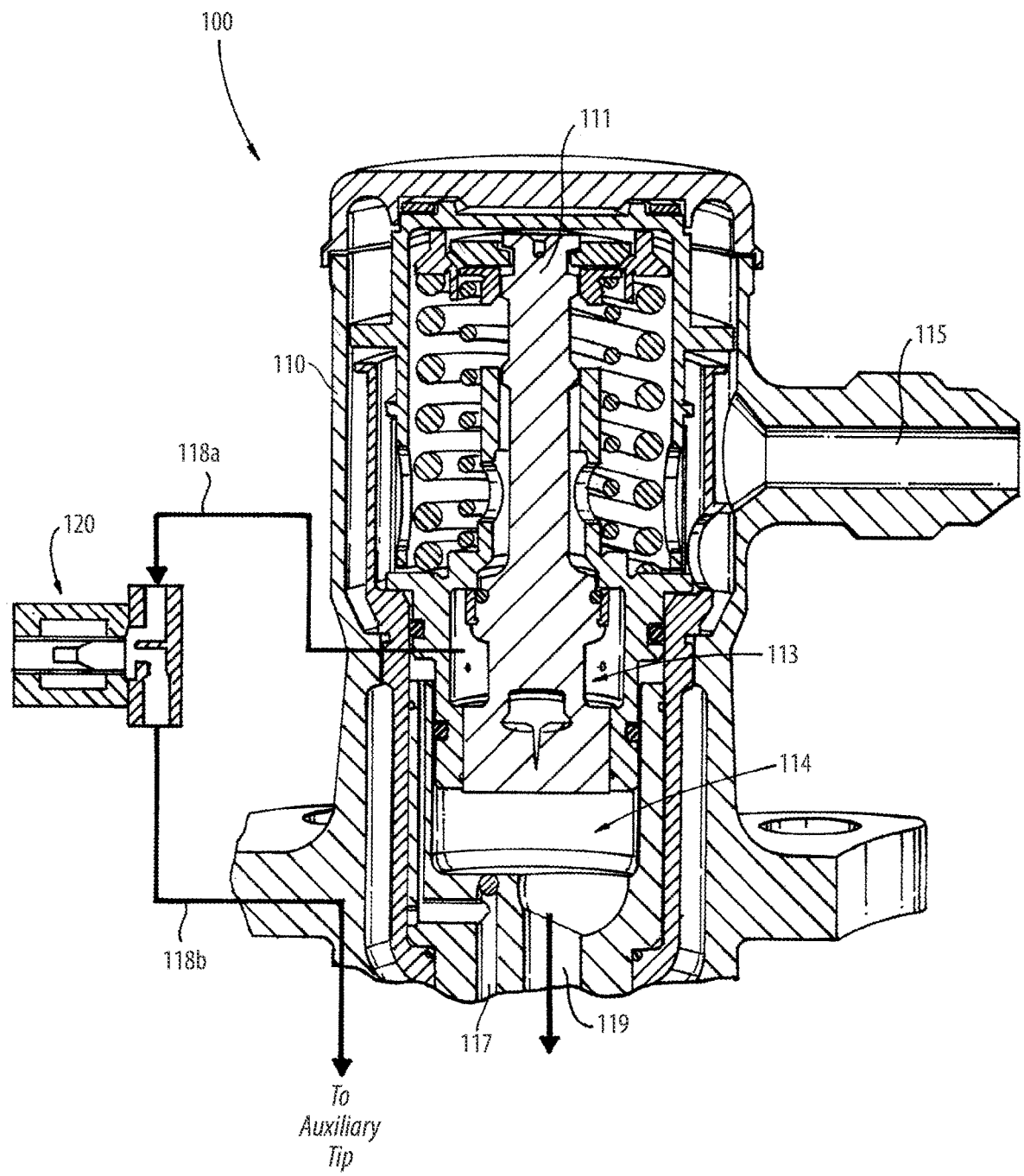
FIG. 1 is a schematic cross-sectional perspective view of a first embodiment of a valve arrangement for a fuel injector in accordance the present invention.

Reference will now be made to the drawings wherein like reference numerals identify similar structural features or aspects of the subject disclosure. For purposes of explanation and illustration, and not limitation, representative embodiments and aspects of the subject devices, systems and related methods are described. The devices, systems and methods described herein can be used to provide adjustment to fuel flow through otherwise passive valves, e.g. to mitigate acoustics, emissions or flame-out conditions, or to otherwise provide active patternation in fuel injection for gas turbine engines.

With reference to FIG. 1, there is illustrated a schematic cross-sectional perspective view of a valve arrangement 100 for a fuel injector in accordance with one aspect of the present invention. The valve 100 includes a housing 110, a fuel inlet 115, and a movable valve member or spool 111, which is fitted inside the housing 110, and resiliently urged into a normally closed position, unless acted on by sufficient inlet fuel pressure to overcome the biasing force(s). When experiencing increased fuel pressure of a predetermined value, the spool 111 is urged downward, allowing fuel to pass into a primary outlet chamber 113. Fuel is thus supplied to a primary fuel circuit 117. In the illustrated embodiment, fuel is also supplied to an auxiliary fuel circuit 118 leading from the primary outlet chamber.

An electrically-controlled valve 120 is provided in the auxiliary fuel circuit 118, with a first portion 118a thereof leading from the primary fuel outlet chamber 113 to the electrically-controlled valve 120, and a second portion 118b leading from the electrically-controlled valve 120 and toward an auxiliary fuel nozzle. The electrically-controlled valve 120 enables active adjustment of fuel flowing through the auxiliary fuel circuit 118. Depending on the implementation, the electrically-controlled valve 120 can be formed integrally with the housing 110, or formed separately, attached thereto.

If higher fuel pressure is applied via fuel inlet 115, such as when higher power output is required, the spool 111 is urged further downward, opening a path for fuel to enter a secondary fuel outlet chamber 119, and thus also a secondary fuel circuit 119. Primary fuel circuit 117 and secondary fuel circuit 119 continue to deliver fuel to respective primary and secondary fuel nozzles of an associated fuel injector, while the auxiliary fuel circuit 118 delivers fuel at the command of the electrically-controlled valve 120. In alternate implementations, the same valve arrangement 100 can be used in conjunction with multiple injectors simultaneously. That is, instead of providing a valve arrangement 100 on each individual injectors, it may be advantageous, depending on the implementation, to distribute the fuel from each of the primary 117, secondary 119 and auxiliary 118 fuel channels to groups of multiple fuel injectors and their respective nozzles.

As such, the valve arrangement 100, including electrically-controlled valve 120 on the auxiliary fuel circuit, permits active control of fuel flow rate through the auxiliary fuel circuit 118, in addition to the regular fuel pressure-based flow schedule determined by the purely mechanical components of the valve 100. Such control may be desirable in order to change the characteristics of the fuel being injected into the combustor of the turbine engine in order to control acoustics, emissions, or mitigate the potential for flame-out, for example.

Advantageously, because active control is only provided for a portion of fuel flow, a smaller valve operator is needed than would be required for full electric fuel control. Also for this reason and because use of active control will typically be limited to certain operating conditions, any additional electrical power requirements are also minimized, along with associated heat generation.

The electrically-controlled valve 120 can be of any suitable type, as may be dictated by the desired implementation. Suitable valves can be of solenoid-operated type, or those utilizing electroactive (e.g. piezoelectric) materials, such as those described by U.S. Patent Publication No. 2016/0230904 to Zarrabi et al., which is incorporated herein by reference, in its entirety. Alternatively, proportional or modulating operators can be utilized, such as by use of a stepper-motor actuator, as well as 3-way solenoid valves or magnetorestrictive valves.

Figure 2:
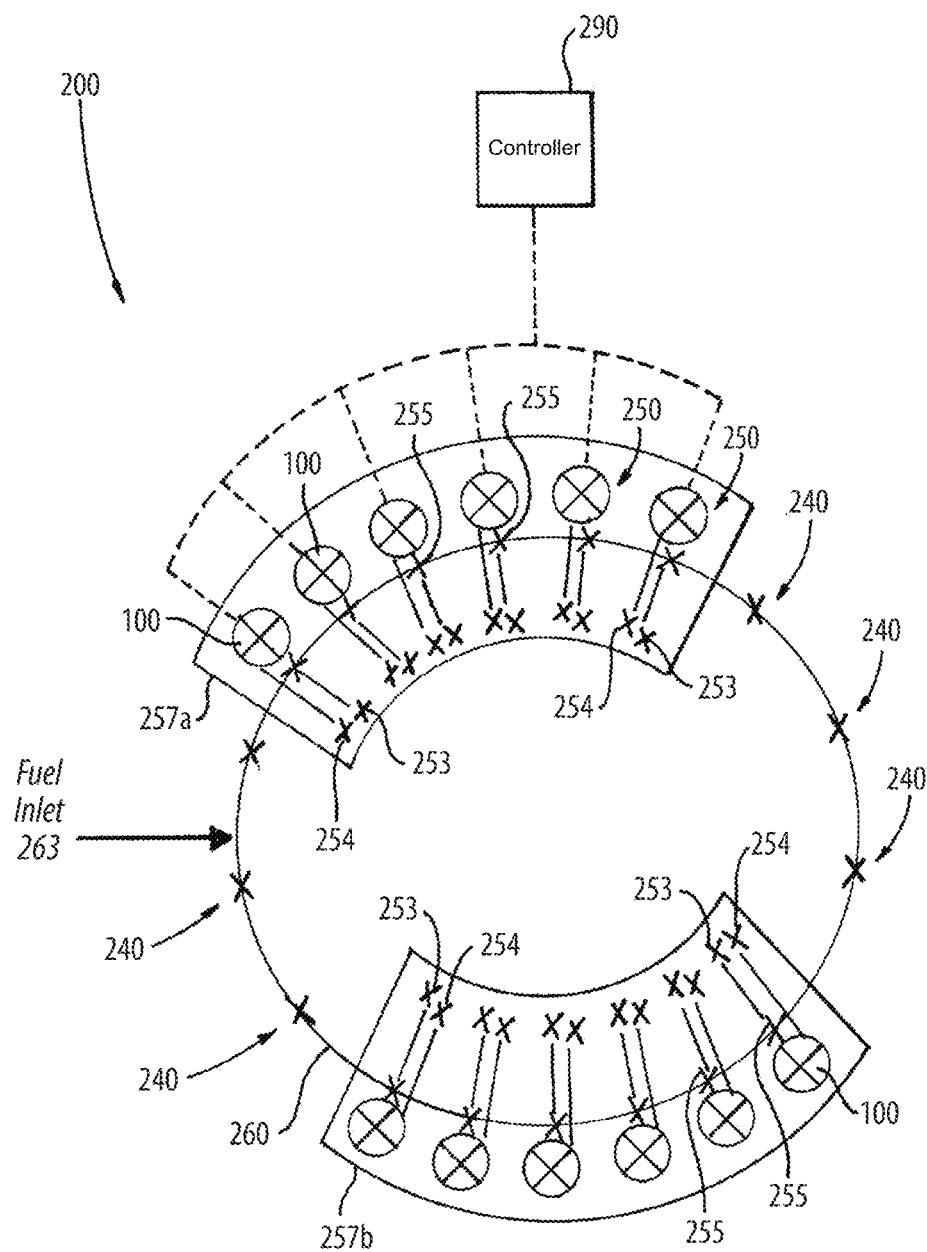
FIG. 2 is a schematic diagram of a fuel supply system for a jet turbine engine in accordance with a further aspect of the invention, which includes multiple fuel injectors incorporating the valve arrangement of FIG. 1, along with triplex fuel nozzles.

With reference now to FIG. 2, there is illustrated a fuel supply system 200, which includes a plurality of triplex injectors 250, each with a valve arrangement 100 as shown in FIG. 1. Each triplex injector 250 includes a primary nozzle 253, a secondary nozzle 255, and an auxiliary nozzle 254 respectively fed by primary 117, secondary 119 and auxiliary 118 fuel circuits of the injector, as described above.

In the illustrated embodiment, also illustrated are a plurality of simplex fuel injectors 240, configured so as to act as secondary nozzles, passively—that is, to become active with other secondary nozzles 255 of the system 200 in response to increased fuel pressure above a predetermined level. The triplex 250 and simplex 240 injectors are connected by way of a single fuel manifold 260, which receives fuel via inlet 263, optionally from a common fuel metering valve. Alternatively, also in accordance with the invention, and as will be appreciated by those skilled in the art, different combinations of valve types can be combined, such as duplex injectors in place of simplex injectors 240. Moreover, such duplex injectors can be of a purely passive design, as discussed above, depending on the desired implementation.

A controller 290 is also illustrated interfacing with respective valves 100, in order to actively adjust fuel flow, as described above. For the sake of simplicity, electrical connections are only illustrated for a portion of the triplex injectors 250 having electrically-controlled valves 120. The controller can be configured so as to enable individual control of each electrically-controlled valve 120, or alternatively, can be configured so as to control them in predetermined groupings or in "ganged" fashion.

As illustrated, a first sub-set of triplex injectors 257a is grouped circumferentially offset from the second sub-set of triplex injectors 257b. In the illustrated embodiment there are also two groups of three passive simplex injectors 240, also separated circumferentially from one another. Those skilled in the art will readily appreciate that this circumferential arrangement can be modified as needed for a given engine application, and that control of the injectors 240, 250 as described herein allows for finely tuned control of the flame in an associated combustor.

Further, the control of electrically-controlled valves 120 can be based on sensor feedback from one or more sensors in the system 200, such as mass flow sensors, pressure sensors and/or valve position sensors, which can allow for health monitoring and active flow control. Moreover, of the actively controlled valves, the controller 290 can control certain valves to have higher flow rates than others. That is, if one valve 120 is set to reduce flow, other valves 120 can be set to increase flow to compensate. Such active balancing can prove effective in the dynamics of a turbine combustion chamber. With regard to operation, when valves are actuated to increase or reduce fuel flow rates, the valves can be actuated gradually and/or sequentially to minimize sudden pressure fluctuations within the fuel system 200.

There are various potential benefits of systems and methods as disclosed herein, as follows. Among the benefits are that failure modes of the electrically-controlled valves 120 add little if any additional risk for operation of the injectors—in the unlikely event of a component failure, the affected injector would revert to standard mechanical operation. Further, systems and methods as disclosed herein allow for removal of the engine flow divider valve and associated fuel manifolds, fittings, and the like, and allow primary, secondary and auxiliary circuits to be supplied by a single manifold while still providing active control.

Figure 3:
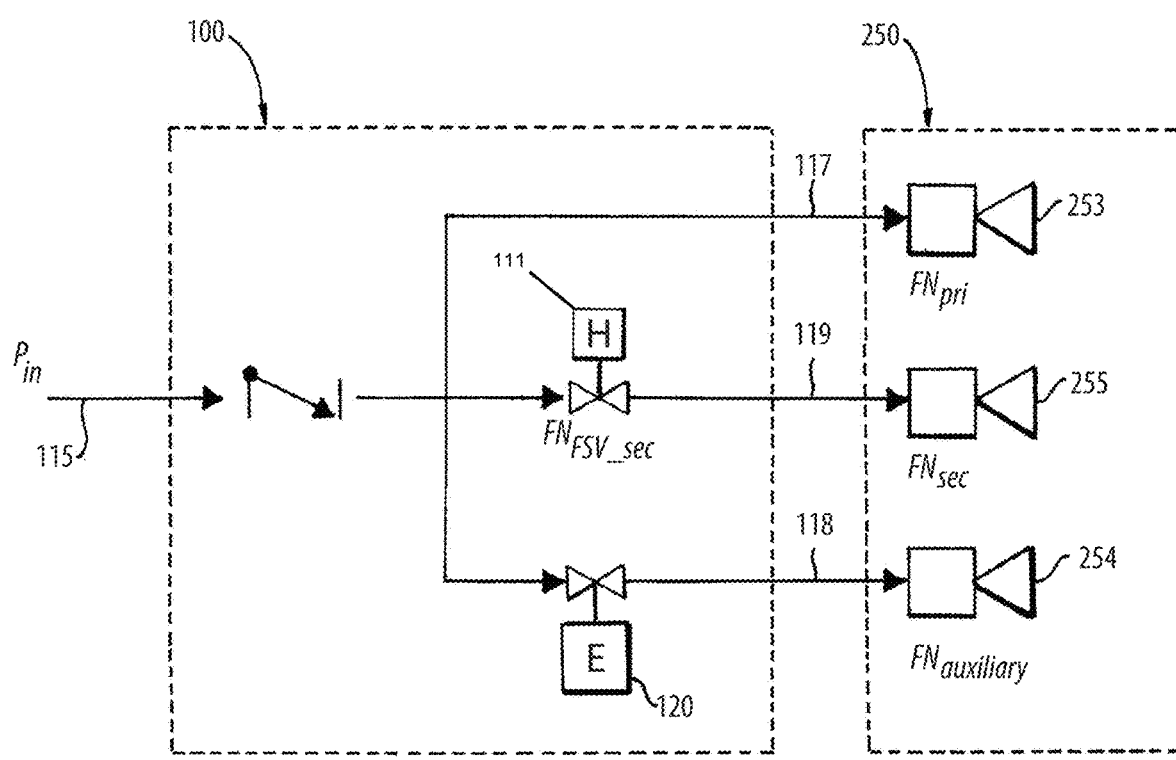
FIG. 3 is a schematic diagram of the valve arrangement of FIG. 1.

FIG. 3 is a schematic diagram of the valve arrangement of FIG. 1, illustrating the functional arrangement of components of the valve 100 and its associated fuel injector 250. Illustrated is the fuel inlet 115, followed by a check function, accomplished by a first open position of the valve spool 111 of FIG. 1. After that, fuel is divided into primary 117, secondary 119 and auxiliary 118 fuel circuits. The primary fuel circuit 117 leads directly to the primary nozzle 253 of the fuel injector 250. The secondary fuel circuit 119 leads through the fuel scheduling function accomplished also by the valve spool 111, and to the secondary nozzle 255 of the fuel injector 250. The auxiliary fuel circuit 118 leads through the electrically-controlled valve 120 and to the auxiliary nozzle 254 of the fuel injector 250.

Figure 4:
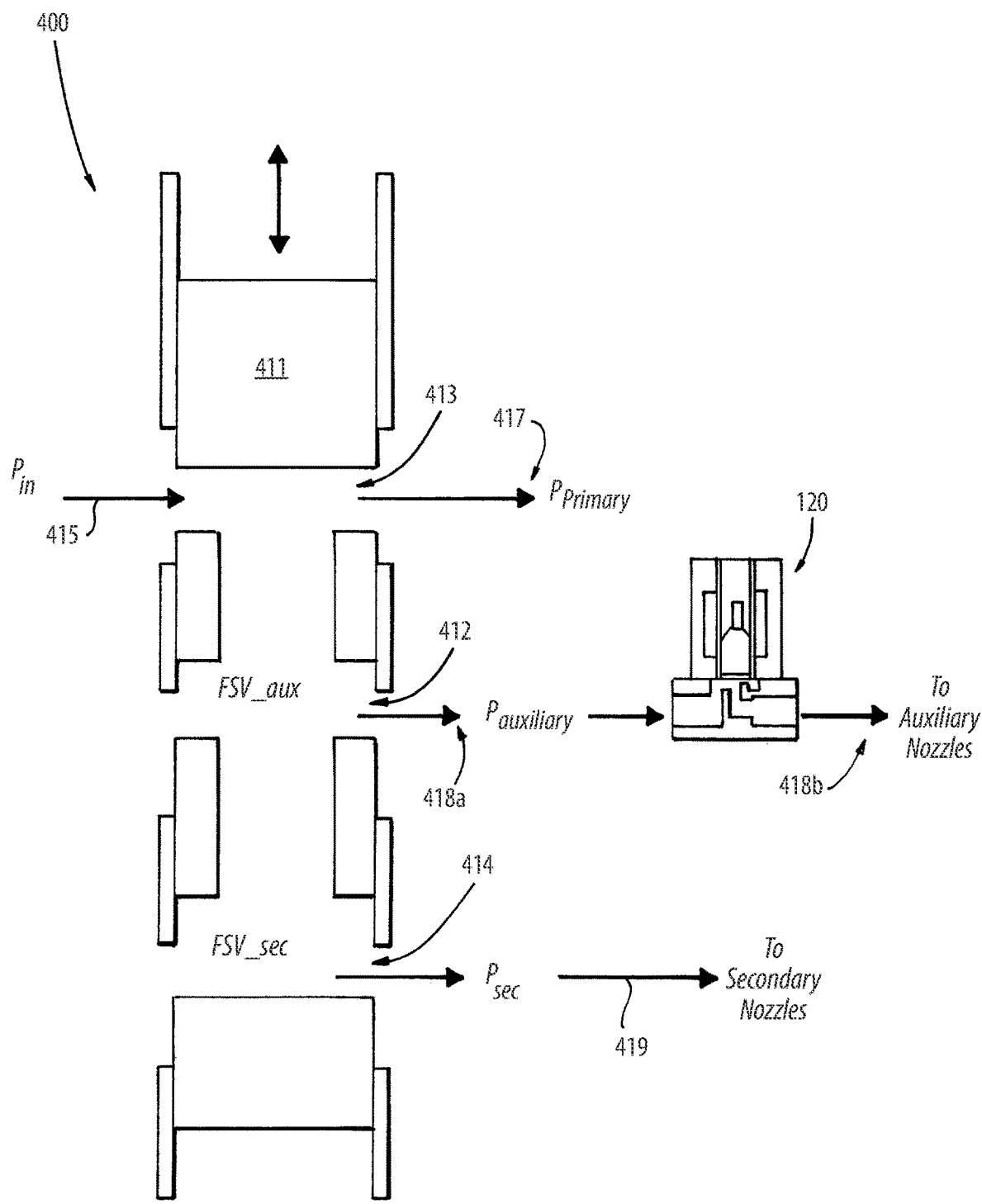
FIG. 4 is a schematic cross-sectional view of a second embodiment of a valve arrangement for a fuel injector in accordance with the present invention.

With reference now to FIG. 4, there is illustrated a schematic cross-sectional view of a second embodiment of a valve arrangement 400 for a fuel injector in accordance with an additional aspect of the present invention. In short, the function of the valve 400 is similar to that of valve 100 of FIG. 1, but where the auxiliary fuel circuit 418 is additionally mechanically controlled by the configuration of the valve spool 411.

The valve 400 includes a housing (not illustrated), a fuel inlet 415, and a movable valve member or spool 411, which is fitted inside the housing, and resiliently urged into a normally closed position, unless acted on by sufficient inlet fuel pressure to overcome the biasing force(s). When experiencing increased fuel pressure of a predetermined value, the spool 411 is urged downward, allowing fuel to pass into a primary outlet chamber 413. Fuel is thus supplied to a primary fuel circuit 417.

Depending on the configuration of the spool 411, fuel is supplied to an auxiliary fuel circuit 418 leading from an auxiliary outlet chamber 412 at a prescribed range in the position of the spool 411, which can be selected as required by the precise implementation.

If higher fuel pressure is applied via fuel inlet 415, such as when higher power output is required, the spool 411 is urged further downward, opening a path for fuel to enter a secondary fuel outlet chamber 414, and thus also a secondary fuel circuit 419. The primary fuel circuit 417 and secondary fuel circuit 419 continue to deliver fuel to respective primary and secondary fuel nozzles of an associated fuel injector, while the auxiliary fuel circuit 418 delivers fuel at the command of the electrically-controlled valve 120.

The electrically-controlled valve 120 is provided in the auxiliary fuel circuit 418, with a first portion 418a thereof leading from the auxiliary outlet chamber 412 to the electrically-controlled valve 120, and a second portion 418b leading from the electrically-controlled valve 120 and toward an auxiliary fuel nozzle. The electrically-controlled valve 120 enables active adjustment of fuel flowing through the auxiliary fuel circuit 417. Depending on the implementation, the electrically-controlled valve 120 can be formed integrally with a housing of the valve 400 or separately attached thereto.

In alternate implementations, the same valve arrangement 400 can be used in conjunction with multiple injectors simultaneously. That is, instead of providing a valve arrangement 400 on each individual injectors, it may be advantageous, depending on the implementation, to distribute the fuel from each of the primary 417, secondary 419 and auxiliary 418 fuel channels to groups of multiple fuel injectors and their respective nozzles.

As such, the valve arrangement 400, including electrically-controlled valve 120 on the auxiliary fuel circuit 418, permits active control of fuel flow rate through the auxiliary fuel circuit 418, in addition to the regular fuel pressure-based flow schedule determined by the purely mechanical components of the valve 100.

Figure 5:
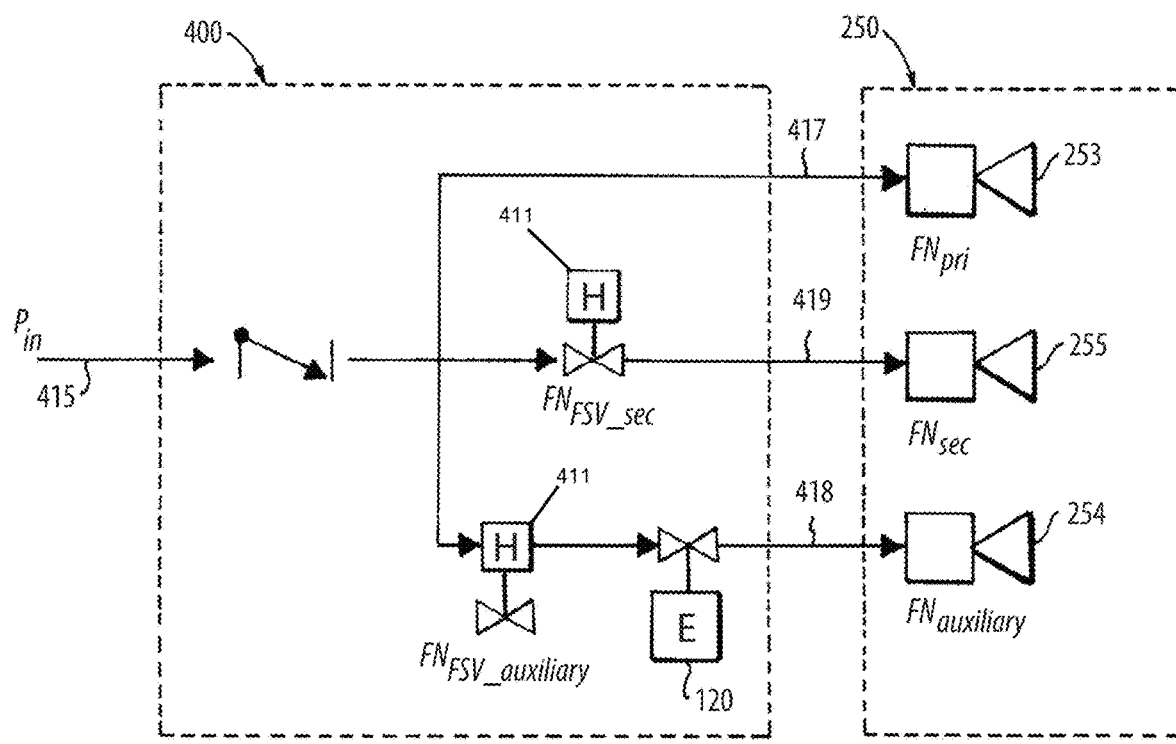
FIG. 5 is a schematic diagram of the valve arrangement of FIG. 4.

FIG. 5 is a schematic diagram of the valve arrangement 400 of FIG. 4, illustrating the functional arrangement of components of the valve 400 and its associated fuel injector 250. Illustrated is the fuel inlet 415, followed by a check function, accomplished by the positon of the valve spool 411 of FIG. 4. After that, fuel is divided into primary 417, secondary 419 and auxiliary 418 fuel circuits. The primary fuel circuit 417 leads directly to the primary nozzle 253 of the fuel injector 250. The secondary fuel circuit 419 leads through the fuel scheduling function accomplished also by the valve spool 411, and to the secondary nozzle 255 of the fuel injector 250. In this embodiment, the auxiliary fuel circuit 418 leads also through a fuel scheduling function accomplished by the valve spool 411, and then through the electrically-controlled valve 120 and to the auxiliary nozzle 254 of the fuel injector 250. As such, the fuel schedule for the auxiliary fuel circuit 418, as dictated by the configuration of the spool 411 can be selected as desired. That is, the fuel schedule for the auxiliary fuel circuit 418 can be largely binary, leaving any modulation or gradual control to the electrically-controlled valve 120, which then can be either binary (e.g., solenoid-type), or a more precisely controlled type of electrically-operated valve (e.g., with a stepper motor actuator). Alternatively, the fuel schedule for the auxiliary fuel circuit 418 can be gradually opening, as dictated by the shape of the spool 411, depending on the desired operational characteristics and/or system limitations.

Figure 6:
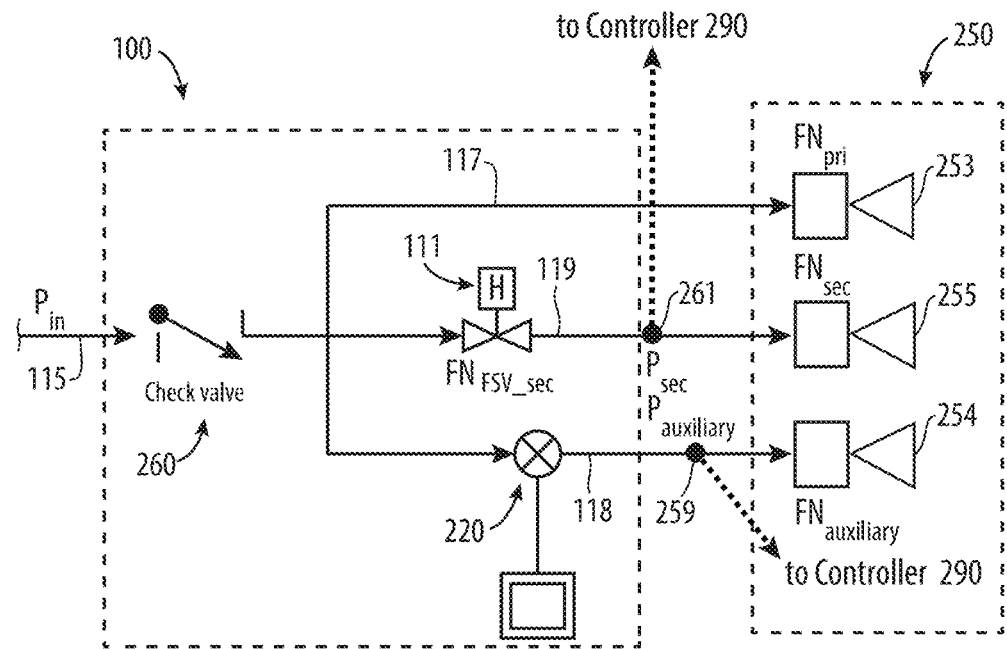
FIG. 6 is a schematic diagram of a valve arrangement of FIG. 3, showing a proportional valve in the auxiliary fuel circuit.

With reference now to FIG. 6, the electrically-controlled valve 120 is a discrete open/closed valve even if a modulating type valve is used, however it is also contemplated that it can instead be a proportional valve 220, with intermediate conditions between fully open and fully closed. The proportional valve 220 includes a proportional solenoid, a stepper motor, or a torque motor based servo valve with flapper and nozzle.

Figure 7:
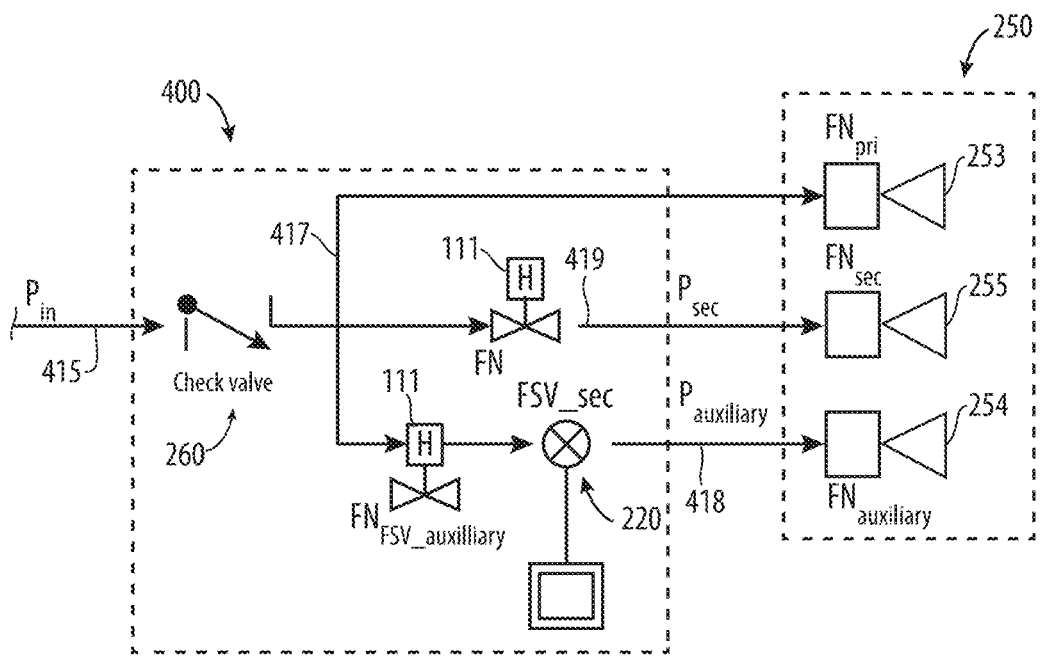
FIG. 7 is a schematic diagram of a valve arrangement of FIG. 5, showing a proportional valve in the auxiliary fuel circuit.
Figure 8:
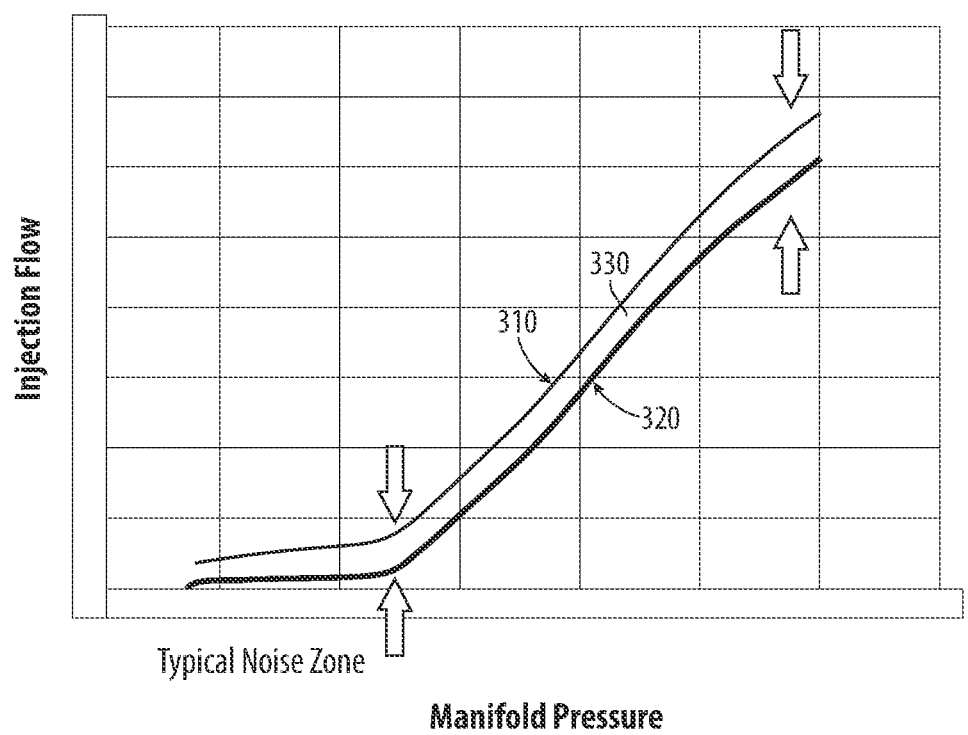
FIG. 8 is a graph of injector flow versus manifold pressure for a valve arrangement of FIGS. 1, showing a first baseline, e.g. with the valve of the auxiliary fuel circuit fully closed, showing a second baseline, e.g. with the valve of the auxiliary fuel circuit fully open, and showing the area in between the first and second baselines, e.g. which is available with proportional control of a proportional valve of FIGS. 6-7.

If a stepper motor is used, multiple discrete steps can be used between fully open and fully closed. The check valve 260 is upstream of the branch between the primary, secondary, and auxiliary circuits 117, 118 and 119, and a hydraulic valve, i.e. incorporating the valve spool 111 of FIG. 1 is in the secondary line 119 of the valve 100 for control of flow through the secondary circuit 119. Proportionally controlling the electrically controlled valve 220 between fully opened and fully closed states allows for intermediate flow states for fine tuning as needed to combustion conditions. FIG. 6 shows the configuration from FIG. 4 using a proportional valve 220, and FIG. 7 similarly shows the configuration from FIG. 5, but using a proportional valve 220 as described above for FIG. 6. FIG. 7 shows a graph of injector flow rate versus manifold pressure for total flow through the injector, e.g. flow through the inlet 115. The first line 310 shows the flow response over a range of manifold pressures with the electrically-controlled valve 220 fully open, and the second line 320 shows the same but for the electrically-controlled valve 220 fully closed. Proportional control between fully closed and fully opened allows fine tuning of the flow at a given manifold pressure to the area between the two lines 310 and 320. The large arrows in FIG. 8 indicate the range of the typical noise zone, and the area between lines 310 and 320 extends over a considerable percentage of the typical noise zone. Proportional control within the area between the lines 310, 320 can provide a benefit to have more tailoring between the on/off of the valve states including improved pull away, light around, noise mitigation, and injector to injector total flow profiling at maximum power to improve turbine life.

With continued reference to FIGS. 2 and 6-7, each of the injectors 250, including the passive injectors 240, can include a mass flow sensor 259 in the auxiliary line 118/418, and/or a mass flow sensor 261 in the secondary line 119/419. Each mass flow sensor 259, 261 can be embedded in contact with fuel passing through the injector 250/240 operatively connected to the controller 290 to provide mass flow feedback to the controller. The sensor signals can be used to control actuators of the electrically-controlled valves 220 to gain more/less uniformity as desired during operation. The sensors 259, 261 can include several devices in isolation or combination, such as a hot wire anemometer, a pitot tube, an ultrasonic transducer, an NIST (National Institute of Standards and Technology) type calibration orifice, a thermocouple, a pressure transducer, a turbine wheel, a Coriolis meter, a chemiluminescence sensor for sensing a signal from flame, or any other suitable type of sensor. The sensors 259, 261 in FIGS. 6-7 can be located where shown, but could also be upstream of the valves or a single sensor for total flow, e.g. total flow through the inlet 115.

There are various potential benefits of systems and methods as disclosed herein, as follows. With systems and methods as disclosed herein, failure of the electrically-controlled valve 120/220 results in limited flow to the primary circuit, not total loss of the primary circuit. Systems and methods as disclosed herein can allow for independent control of the primary circuit to mitigate acoustics, emissions or flame out. Multiple valves can work together as a system, e.g. if one valve is set to reduce flow, others can be opened to increase flow to compensate as the system adapts to stabilize conditions in the combustor. Incorporation of mass-flow sensor, pressure sensor(s), and/or position sensor allows for health monitoring, and for active flow control. Proportional control allows for valves to be gradually actuated to minimize potential pressure spikes within the fuel system. Tailoring flow proportionally between full state switch can improve operability of the engine, including ignition, pull away, and noise mitigations.

The methods and systems of the present disclosure, as described above and shown in the drawings, provide for adjustment of otherwise passive valves for gas turbine engines. While the devices, systems and methods of the subject disclosure have been shown and described with reference to preferred embodiments, those skilled in the art will readily appreciate that changes and/or modifications may be made thereto without departing from the scope of the subject disclosure.

What is claimed is:

1. A fuel injector for a turbine engine comprising:
   a housing having an internal enclosure for pressurized fluid;
   a fuel inlet formed on the housing, permitting delivery of a fuel supply to the fuel injector;
   a scheduling valve disposed within the housing, configured for regulation of fuel flow from the fuel inlet in response to fuel pressure received at the fuel inlet;
   a primary fuel circuit formed in the housing, receiving fuel from the scheduling valve;
   a secondary fuel circuit formed in the housing, receiving fuel from the scheduling valve;
   an auxiliary fuel circuit formed in the housing, receiving fuel from the scheduling valve;
   an electrically-controlled valve in fluid communication with the auxiliary fuel circuit, adapted and configured to actively control fuel through the auxiliary fuel circuit in response to a control signal;
   a fuel nozzle in fluid communication with and receiving fuel from the primary, secondary and auxiliary fuel circuits;
   a primary outlet formed on the nozzle, in fluid communication with the primary fuel circuit;
   a secondary outlet formed on the nozzle, in fluid communication with the secondary fuel circuit; and
   an auxiliary outlet formed on the nozzle, in fluid communication with the auxiliary fuel circuit.

2. The fuel injector of claim 1, wherein the electrically-controlled valve is a discrete open/closed valve.

3. The fuel injector of claim 1, wherein the electrically-controlled valve is a proportional valve with intermediate conditions between fully open and fully closed.

4. The fuel injector of claim 3, wherein the proportional valve includes a proportional solenoid, a stepper motor, or a torque motor based servo valve with flapper and nozzle.

5. The fuel injector of claim 1, wherein the scheduling valve includes a valve spool, biased to a closed position by one or more biasing members, wherein the valve spool is configured to regulate flow from the inlet of the injector to each of the primary and secondary circuits, and wherein the valve spool includes a scheduling surface configured to vary flow area through the secondary circuit based on position of the valve spool within the scheduling valve.

6. The fuel injector of claim 5, wherein the valve spool is additionally configured to regulate flow from the inlet of the injector to the auxiliary fuel circuit.

7. The fuel injector of claim 6, wherein the auxiliary fuel circuit branches off of the primary fuel circuit.

8. The fuel injector of claim 5, wherein the auxiliary fuel circuit is an independent fuel circuit downstream from the scheduling valve.

9. The fuel injector of claim 5, wherein activation of the electrically-controlled valve controls fuel flow rate through the auxiliary fuel circuit.

10. A fuel supply system for a turbine engine, comprising:
    a single fuel manifold adapted to receive and distribute a fuel supply to a plurality of points of the turbine engine; and
    plurality of fuel injectors distributed around a periphery of the engine, adapted and configured to receive fuel from the single fuel manifold, at least one of the fuel injectors having:
    a housing having an internal enclosure for pressurized fluid;
    a fuel inlet formed on the housing, permitting delivery of fuel supply from the single fuel manifold to the fuel injector;
    a scheduling valve disposed within the housing, configured for regulation of fuel flow from the fuel inlet in response to fuel pressure received at the fuel inlet;
    a primary fuel circuit formed in the housing, receiving fuel from the scheduling valve;
    a secondary fuel circuit formed in the housing, receiving fuel from the scheduling valve;
    an auxiliary fuel circuit formed in the housing, receiving fuel from the scheduling valve;
    an electrically-controlled valve in fluid communication with the auxiliary fuel circuit adapted and configured to actively control fuel through the auxiliary fuel circuit in response to a control signal;
    a fuel nozzle in fluid communication with and receiving fuel from the primary, secondary and auxiliary fuel circuits;
    a primary outlet formed on the nozzle, in fluid communication with the primary fuel circuit;
    a secondary outlet formed on the nozzle, in fluid communication with the secondary fuel circuit; and
    an auxiliary outlet formed on the nozzle, in fluid communication with the auxiliary fuel circuit.

11. The fuel supply system of claim 10, wherein the electrically-controlled valve is a discrete open/closed valve.

12. The fuel supply system of claim 10, wherein the electrically-controlled valve is a proportional valve with intermediate conditions between fully open and fully closed.

13. The fuel supply system of claim 12, wherein the proportional valve includes a proportional solenoid, a stepper motor, or a torque motor based servo valve with flapper and nozzle.

14. The fuel supply system of claim 10, further comprising:
    at least one passive fuel injector, receiving fuel from the single fuel manifold.

15. The fuel supply system of claim 14, wherein the at least one passive fuel injector includes only one nozzle.

16. The fuel supply system of claim 10, further comprising:
    a metering valve adapted and configured to receive a fuel supply from a fuel pump, and output the fuel to the single manifold.

17. The fuel supply system of claim 10, further comprising a controller electrically connected to the electrically-controlled valve on at least one fuel injector.

18. The fuel supply system of claim 17, wherein the controller is connected to the electrically-controlled valve on the at least one fuel injector for individual control thereof.

19. The fuel supply system of claim 17, wherein the controller is connected to the electrically-controlled valve on the at least one fuel injector for ganged control thereof.

20. The fuel supply system of claim 17, wherein each of the injectors in the plurality of fuel injectors includes a mass flow sensor operatively connected to the controller to provide mass flow feedback to the controller.

* * * * *